L. F. MILLER.
SEED POTATO CUTTER.
APPLICATION FILED JUNE 4, 1906.
942,969.
Patented Dec. 14, 1909.
2 SHEETS—SHEET 2.
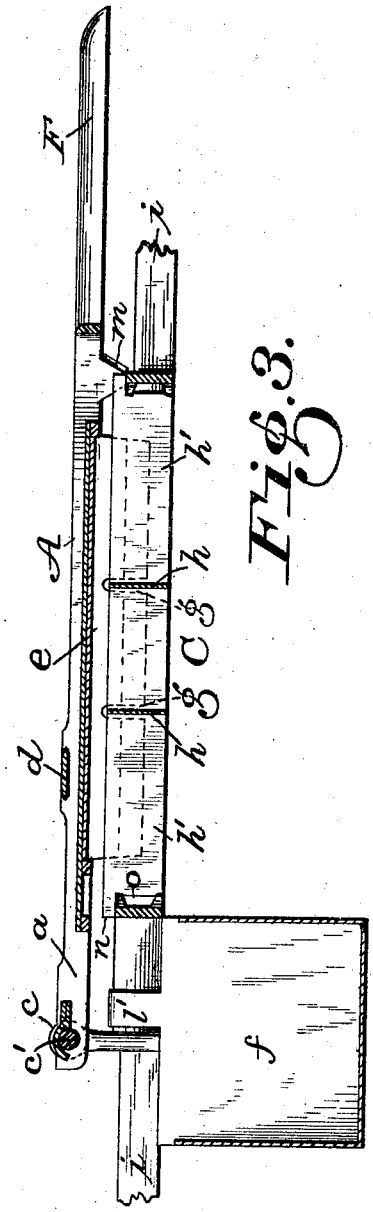
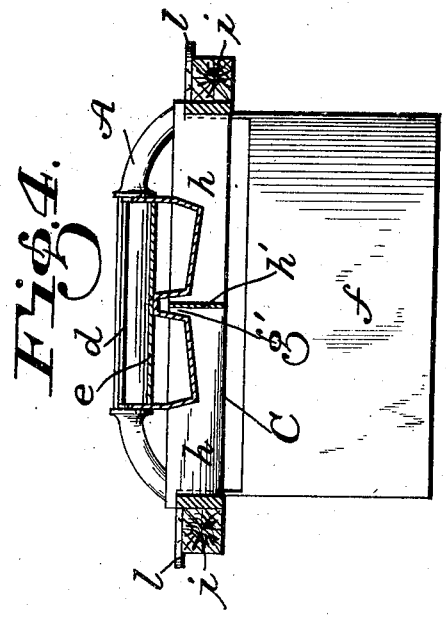
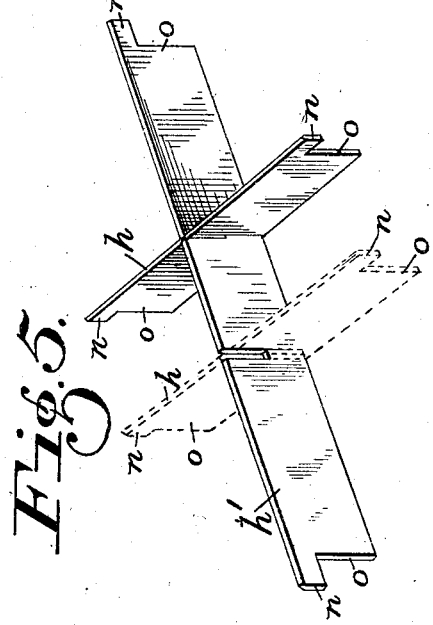

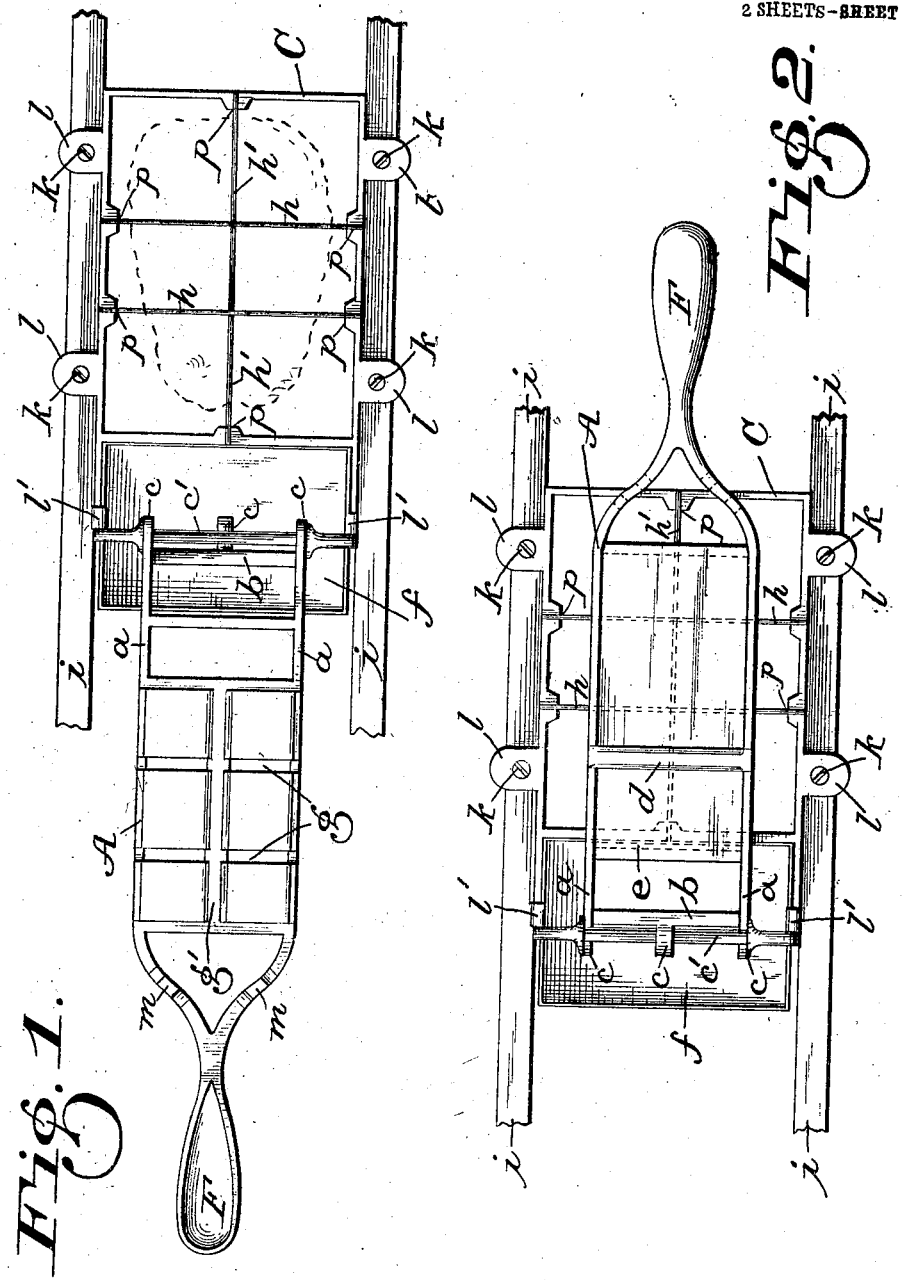

UNITED STATES PATENT OFFICE.

LEWIS F. MILLER, OF BATH TOWNSHIP, GREENE COUNTY, OHIO.

SEED-POTATO CUTTER.

942,969.

Specification of Letters Patent.

Patented Dec. 14, 1909.

Application filed June 4, 1906. Serial No. 320,039.

*To all whom it may concern:*

Be it known that I, LEWIS F. MILLER, a citizen of the United States, residing in Bath township, in the county of Greene and State of Ohio, have invented certain new and useful Improvements in Seed-Potato Cutters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a handy device or tool, to facilitate in the labor of cutting potatoes for seeding purpose,—or in other words what is ordinarily termed a seed-potato cutter.

Some of the principal objects of said invention consist in producing a device as above referred to, for cutting potatoes into small blocks or sections to be used as seed in planting, that will be composed of few parts; simple in construction; can be quickly and easily operated; is inexpensive in cost of manufacture; is more effective in its results than those in present use; and one that combines therewith the blossom-end cutter.

This invention consists essentially, referring briefly and in general terms to the construction of my improved seed-potato cutter; of an upper-section, provided with a handle, and a blossom-end cutter or knife; and a lower section provided with cutters or knives, supporting bars or rods, and a receptacle adapted to receive the blossom-ends as cut; and other minor details of construction; and the very peculiar and novel construction, arrangement and combination of these various mechanical parts, as will be hereinafter more fully described in detail, and set forth in the subjoined claims, in accordance with the statutes in such cases made and provided therefor.

Referring to the accompanying drawings illustrating my invention, and constituting a formal part of this specification, and wherein the same letters of reference are used to indicate or point out the same parts wherever occurring throughout the several views:—Figure 1 is a plan view of my improved seed potato cutter, opened and in an operative position ready to receive the potato. Fig. 2 is a plan view showing the device as closed, and the parts in the position they assume after cutting a potato. Fig. 3 is a vertical longitudinal sectional view of the device when closed as shown in Fig. 2—but on a slightly enlarged scale therefrom. Fig. 4 is a vertical transverse sectional view of the device when closed as shown in Fig. 2,—but on a slightly enlarged scale therefrom; and Fig. 5 is a perspective view of the cutters or knives in detail.

In describing my said invention specifically, and referring in detail to the various mechanical parts, features or elements of construction of my improved seed potato cutter, A refers to the upper section having the side-pieces $a$, which project or extend sufficiently at the front—where they are connected by a brace-bar $b$, so as to allow of a pivotal or hinged connection at $c$—(of any preferred style desired)—with the end-bar $c^1$ of lower section C, thus making said upper-section pivotally connected thereon as shown. Said upper-section being provided with a flat portion or blade which connects with said side-pieces and extends transversely across the top thereof and is sufficiently sharp at the edges to form a cutter or knife $d$, for first removing the blossom ends or sprouts from the potato to be cut into blocks or sections for seeding; said blossom ends as cut falling underneath upon the floor or guide-plate $e$ of said upper section, and as said section is raised by means of its handle F—as shown in Fig. 2, to the position shown in Fig. 1,—the cut blossom ends or sprouts, will slide or pass from said guide-plate into the trough or receptacle $f$ adapted to receive them. The under face or bottom portion of said upper-section being formed with grooves or recesses $g$ and $g^1$, adapted to rest over knives $h$ and $h^1$, whereby the division of space or portions left by grooves $g$ and $g^1$ in the bottom of the upper section—when sections A and C are brought together in closing the device (see Figs. 2, 3 and 4)—will act as plungers, and force or push the block or seeds into which the potato has been cut, down and out through the space left between the knives in said lower section C, which will now drop down into the box or other suitable and convenient receptacle;—not necessary to be here shown as it is no part of this invention,—adapted to receive them; and upon which said device rests and is supported by means of bars or rods $i$;—which for convenience in illustrating are here shown as partially broken away;—said bars being detachably connected to said lower-section by screws or otherwise as at $k$, which pass through the lips $l$ projecting from the side portions of the frame of lower-section C.

Receptacle $f$, is detachably connected to and supported from the frame of lower-section C, by means of small hooks $l^1$, one of which is located on each side of said receptacles. Handle F of said upper-section is provided with small supporting-lugs or stops $m$ adapted to rest upon the front cross-piece of the frame of said lower section, when said sections are closed and the parts are in their normal position as shown more particularly in Figs. 2 and 3.

Although the number of knives or cutters may be varied according to the dimensions or size of the pieces or blocks constituting the seed into which the potato is to be cut; I prefer to employ two cross, or transverse, knives $h$, and one longitudinal knife $h^1$; said knives being provided as fully and clearly shown in Fig. 5, with supporting-ends $n$, which rest on the top of said frame, while the ends $o$,—see Fig. 5,—are intended to rest in grooves in the frame adapted to receive them as at $p$—as can be readily understood from Figs. 1 and 2, and not necessary to be here shown in detail.

The potato to be cut, after first having any blossom ends or sprouts there may be on it, removed,—as heretofore fully and clearly referred to;—is placed upon the knives or cutters $h$ and $h^1$,—as shown by dotted lines,—when the device is in an open position as seen in Fig. 1; and when upper-section A is brought over and onto lower-section C, thus closing the device as shown in Fig. 2, and cutting the potato into blocks or seeds as heretofore fully and clearly referred to.

Having now described my improved seed-potato cutter, taken as illustrated in connection with the accompanying drawings, what I claim is:—

1. In a device of the character described, a frame, suitable knives mounted therein, a swinging plunger adapted to force the article cut through said knives, a knife mounted upon the upper face of said swinging plunger, said swinging plunger adapted to convey the cuttings from said knife to a suitable receptacle provided at one extremity of said frame.

2. In a seed potato cutter, a suitable support, a frame-work, transverse and longitudinal knives carried thereby, a receptacle mounted at one extremity thereof, a bracket carried by said receptacle, a swinging plunger mounted on said bracket, the plunger being formed of sheet metal, and having integral projections stamped therefrom which pass between the knives, as and for the purpose set forth.

In testimony whereof, I affix my signature, in presence of two witnesses.

LEWIS F. MILLER.

Witnesses:
B. A. ROSE,
WM. F. HAYNE.